(12) United States Patent
Ueda et al.

(10) Patent No.: US 9,652,062 B2
(45) Date of Patent: May 16, 2017

(54) DISPLAY CONTROL DEVICE, DISPLAY CONTROL METHOD, RECORDING MEDIUM, AND IMAGE PROCESSING APPARATUS

(71) Applicant: Konica Minolta, Inc., Tokyo (JP)

(72) Inventors: Hiroki Ueda, Aichi (JP); Akihiko Oda, Aichi (JP); Manabu Furukawa, Kyoto (JP); Hiroki Tajima, Aichi (JP); Kenzo Yamamoto, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 302 days.

(21) Appl. No.: 14/486,664

(22) Filed: Sep. 15, 2014

(65) Prior Publication Data
US 2015/0082213 A1   Mar. 19, 2015

(30) Foreign Application Priority Data
Sep. 17, 2013   (JP) .................................. 2013-191397

(51) Int. Cl.
*G06F 3/0481* (2013.01)
*G06F 3/041* (2006.01)
(Continued)

(52) U.S. Cl.
CPC ............ *G06F 3/041* (2013.01); *G06F 3/0484* (2013.01); *G06F 3/0485* (2013.01);
(Continued)

(58) Field of Classification Search
CPC ........... H04N 1/32518; H04N 1/32534; H04N 1/32577; H04N 1/32582; H04N 1/00442;
(Continued)

(56) References Cited

U.S. PATENT DOCUMENTS

2007/0121127 A1* 5/2007 Minowa ............. H04N 1/00408
358/1.6
2008/0055252 A1* 3/2008 Miyake ............... G06F 3/04886
345/168

(Continued)

FOREIGN PATENT DOCUMENTS

JP   2004235804 A   8/2004
JP   2012105171 A   5/2012

*Primary Examiner* — William Bashore
*Assistant Examiner* — James F Sugent
(74) *Attorney, Agent, or Firm* — Osha Liang LLP

(57) ABSTRACT

A display control device includes: a display; a touch panel being capable of detecting a gesture; a judgment portion that judges whether or not a screen displayed on the display allows users to operate a display data object with a gesture; a memory; an image generator that determines an image size, that generates an image data object identical with the display data object in the determined image size, and that stores the generated image data object on the memory, upon the screen being judged as allowing users to operate the display data object with a gesture; and a display controller that updates the display data object with the image data object generated by the image generator and stored on the memory, in response to a gesture being performed on the screen, the screen being judged as allowing users to operate the display data object with a gesture.

13 Claims, 15 Drawing Sheets

(51) Int. Cl.
*G06F 3/0484* (2013.01)
*G06F 3/0485* (2013.01)
*G06F 3/0488* (2013.01)

(52) U.S. Cl.
CPC ...... *G06F 3/04883* (2013.01); *G06F 3/04886* (2013.01); *G06F 2203/04803* (2013.01); *G06F 2203/04806* (2013.01)

(58) Field of Classification Search
CPC ........... G06F 3/048; G06F 2203/04805; G06F 2203/04806; G06F 3/0482; G06F 3/04817; G06F 2203/04808; G06F 3/017; G06F 3/0488; G06F 3/04883; G06F 2203/041; G06F 3/03547; G06F 3/041; G06F 3/0412; G06F 3/0414; G06F 3/0416; G06F 3/0418; G06F 3/046; G06F 3/047; G09G 2340/0407; G09G 2340/145; H04M 1/72519; H05K 9/0073; H05K 9/0079; H05K 9/0081; H05K 9/0088
See application file for complete search history.

(56) References Cited

U.S. PATENT DOCUMENTS

| | | | | |
|---|---|---|---|---|
| 2011/0050953 A1* | 3/2011 | Kim | ................... | H04N 5/23219 348/231.1 |
| 2012/0223897 A1* | 9/2012 | Hamada | ............. | H04N 1/00381 345/173 |

* cited by examiner

| Memory Size | Memory space as normal 1.00GB | Memory space including extra memory space 2.00GB |
|---|---|---|
| Coefficient for obtaining the range of pinch gesture motion | 1.00 | 2.00 |

FIG. 16

DISPLAY CONTROL DEVICE, DISPLAY CONTROL METHOD, RECORDING MEDIUM, AND IMAGE PROCESSING APPARATUS

This application claims priority under 35 U.S.C. §119 to Japanese Patent Application No. 2013-191397 filed on Sep. 17, 2013, the entire disclosure of which is incorporated herein by reference in its entirety.

BACKGROUND OF THE INVENTION

Field of the Invention

The present invention relates to: a display control device to be loaded on an image processing apparatus such as a multifunction peripheral (MFP) that is also referred to as multifunctional digital machine; a display control method to be implemented by the display control device; a non-transitory computer-readable recording medium having a display control program stored thereon; and an image processing apparatus.

Description of the Related Art

The following description sets forth the inventor's knowledge of related art and problems therein and should not be construed as an admission of knowledge in the prior art.

There has been a known technique, i.e., an image processing apparatus, such as a multifunctional digital machine that is also referred to as multifunction peripheral (MFP), which is provided with a gesture-enabled operation panel. In such an image processing apparatus, a platform starts generating an image data object when a gesture operation is detected and a display application obtains and displays the generated image data object when the gesture operation is finished.

It is seen in some cases of this technique that an image may be displayed in poor quality or may appear blank because of no other image nearby when being enlarged, because the display data object is updated with an image having been displayed previously when a gesture operation, such as a pinch gesture or a slide gesture, is performed. Thus users bother to check the image when performing a gesture operation, having no chance to obtain new information, which is not user-friendly.

To solve this problem, there is a method of obtaining a new image in response to only a little movement of the coordinate of a touch event on the touch panel, which may cause another problem. That is, with this method, the platform may continue transmitting an image to the display application so many times that the screen hardly can be updated in real time in response to a gesture operation.

To further solve this problem, Japanese Unexamined Patent Publication No. 2012-105171 suggests an image processing apparatus including the following: a memory device that stores a low-resolution image, a medium-resolution image, and a high-resolution image; a preview image generator that generates a preview image from the low-resolution image and that displays the preview image; a low-resolution preview image generator that enlarges or reduces the low-resolution image and that displays the enlarged or reduced low-resolution image, in response to a user instruction to enlarge or reduce the displayed preview image; and a medium-resolution preview image generator that generates a medium-resolution image from the high-resolution or low-resolution image depending on the type of a document and that displays the medium-resolution image in replacement of the displayed preview image, in response to a user instruction to enlarge or reduce the displayed preview image.

According to the cited document, the image processing apparatus is allowed to perform the following: enlarging or reducing a low-resolution image while enlarging or reducing a medium-resolution image; displaying the enlarged or reduced low-resolution image as a preview image before finishing enlarging or reducing the medium-resolution image; and replacing the preview image based on the low-resolution image with another preview image based on the medium-resolution image no sooner than finishing enlarging or reducing the medium-resolution image. Thus users can quickly view the result of enlargement or reduction to eventually see another preview image based on the medium-resolution image as a replacement. That is, the image processing apparatus achieves in high-speed processing and displaying a preview image in good quality even after enlargement or reduction.

Meanwhile, in the technique described in Japanese Unexamined Patent Publication No. 2012-105171, the image processing apparatus is required to have generated a low-resolution image and a high-resolution image and to stored them on the memory device before generating a preview image, which makes the memory space of the memory device occupied for a long period. The image processing apparatus is also required to generate a medium-resolution image from a low-resolution image or a high-resolution image and to enlarge or reduce both the low-resolution image and the medium-resolution image in response to a gesture operation, which makes the whole processing complex.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a display control device including:
a display;
a touch panel being capable of detecting a gesture operation;
a judgment portion that judges whether or not a screen displayed on the display allows users to operate a display data object with the gesture operation;
a memory;
an image generator that determines an image size, that generates an image data object identical with the display data object in the determined image size, and that stores the generated image data object on the memory, upon the screen being judged as allowing users to operate the display data object with the gesture operation; and
a display controller that updates the display data object with the image data object generated by the image generator and stored on the memory, on the basis of the gesture operation being performed on the screen, the screen being judged as allowing users to operate the display data object with the gesture operation.

A second aspect of the present invention relates to a display control method to be implemented by a display control device including:

a display;

a memory; and a touch panel being capable of detecting a gesture operation, the display control method comprising:

judging whether or not a screen displayed on the display allows users to operate a display data object with the gesture operation;

determining an image size, generating an image data object identical with the display data object in the determined image size, and storing the generated image data object on the memory, upon the screen being judged as allowing users to operate the display data object with the gesture operation; and updating the display data object with the image data object generated and stored on the memory, on the basis of the gesture operation being performed on the screen, the screen being judged as allowing users to operate the display data object with the gesture operation.

A third aspect of the present invention relates to a non-transitory computer-readable recording medium having a display control program for a display control device including:

a display;

a memory; and a touch panel being capable of detecting a gesture operation, the display control program being stored on the non-transitory computer-readable recording medium to make a computer of the display control device execute:

judging whether or not a screen displayed on the display allows users to operate a display data object with the gesture operation;

determining an image size, generating an image data object identical with the display data object in the determined image size, and storing the generated image data object on the memory, upon the screen being judged as allowing users to operate the display data object with the gesture operation; and updating the display data object with the image data object generated and stored on the memory, on the basis of the gesture operation being performed on the screen, the screen being judged as allowing users to operate the display data object with the gesture operation.

A fourth aspect of the present invention relates to an image processing apparatus including the display control device as recited in Claim 1, wherein:

the display is capable of displaying an image data object as a preview image;

the judgment portion judges whether or not a screen displayed on the display allows users to operate the preview image with the gesture operation;

the image generator determines an image size, generates an image data object identical with the display data object in the determined image size, and stores the generated image data object on the memory, upon the screen being judged as allowing users to operate the preview image with the gesture operation; and the display controller updates the display data object with the image data object generated by the image generator and stored on the memory, on the basis of the gesture operation being performed on the screen, the screen being judged as allowing users to operate the preview image with the gesture operation.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 16 is a table containing the relationship between the size of memory and the range of pinch gesture motion;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
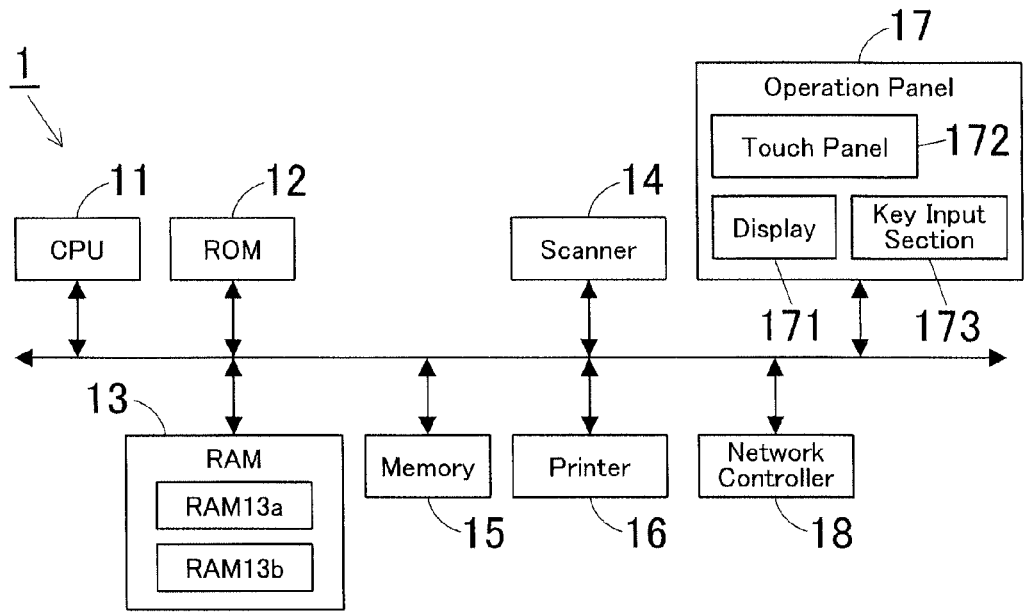
FIG. 1 is a block diagram illustrating a configuration of an image processing apparatus that is provided with a display control device according to one embodiment of the present invention.

FIG. 1 is a block diagram illustrating a configuration of an image processing apparatus that is provided with a display control device according to one embodiment of the present invention.

In this embodiment, a MFP, which has various functions such as a copier function, a printer function, a scanner function, and a facsimile function as described above, is employed as the image processing apparatus 1. Hereinafter, the image processing apparatus will also be referred to as "MFP".

The MFP 1 is provided with: a CPU 11; a ROM 12; a RAM 13; a scanner 14; a memory 15; a printer 16; an operation panel 17; a network controller (also referred to as "NIC"); and others.

The CPU 11 controls the entire MFP 1 in a unified and systematic manner to enable the basic functions such as a copier function, a printer function, a scanner function, and a facsimile function, by executing various programs such as basic operation programs and application programs. The CPU 11 further performs control about screens displayed on the display 171 of the operation panel 17 in the same way. The screen-related control will be later described in detail.

The ROM 12 is a memory that stores basic operation programs for the CPU 11 to execute, and others.

The RAM 13 is a memory that provides a work area for the CPU 11 to perform processing in accordance with an operation program. The RAM 13 includes a platform memory area RAM 13a and an application memory area RAM 13b.

The scanner 14 scans images on a document put on a platen (not shown in this figure) to output an image data object therefrom.

The memory 15 is comprised of a non-volatile memory device such as a hard disk drive (HDD). The memory 15 stores document image data objects obtained by the scanner 14, image data objects received from other image forming apparatuses and user terminals, and others. The image data objects and others stored on the memory 15 can be displayed on the display 171 of the operation panel 17.

The printer 16 prints a document image data object obtained by the scanner 14, a print image data object received from user terminals, and others, in a specified print mode.

The operation panel 17 serves for various user input operations, being provided with the following: a display 171 that is comprised of a liquid-crystal display that displays messages, operation screens, and others; a touch panel 172 that is disposed on the surface of the display 171; and a key input section 173 that is provided with a numeric keypad, a start key, a stop key, and others. Upon being pressed by a user, the touch panel 172 detects a position of a touch event (a touch position). The CPU 11 searches for a button or other object shown in an area where the touch event occurs on the screen, which matches the user's touch position, then executes processing as instructed by the button or other object. In addition to accepting such touch operations as described above, the CPU 11 is capable of accepting gesture operations, i.e., command input operations performed by the user drawing an operating locus via the touch panel 170.

The network controller 18 maintains data transmission and receipt by controlling communication with other image forming apparatuses and external apparatuses such as user terminals on the network.

Figure 2:
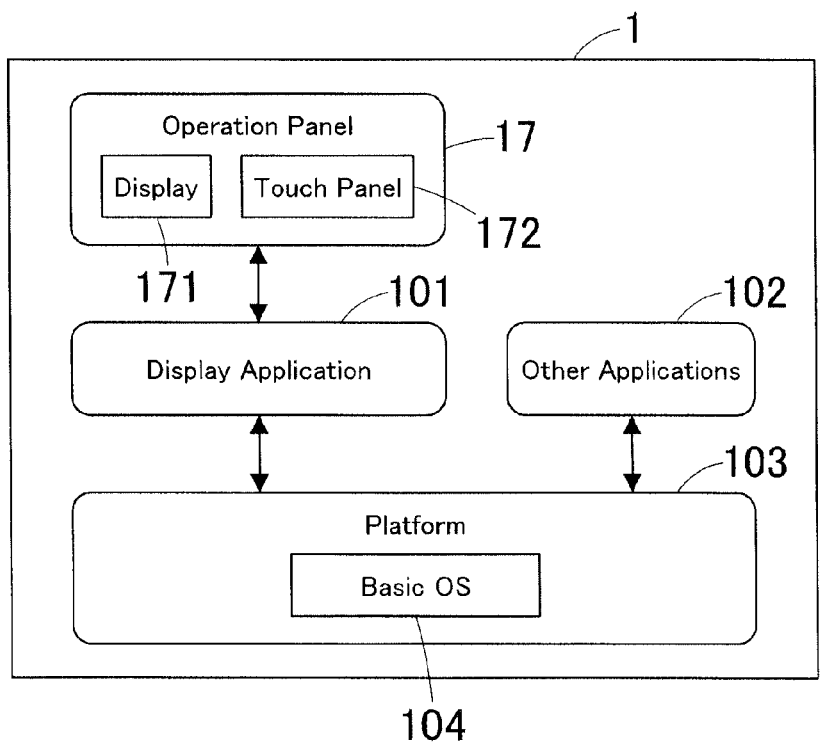
FIG. 2 is a block diagram illustrating a functional configuration of a substantial part of the image processing apparatus.

FIG. 2 is a block diagram illustrating a functional configuration of a substantial part of the MFP 1.

In this embodiment, the MFP 1 has applications and a platform 103. The platform 103 includes software such as a basic OS 104. In this embodiment, the applications include: a display application 101 for the CPU 11 to display a display data object on the display 171 of the operation panel 17 and update the display data object in response to a gesture operation being performed on the touch panel 172; and another application 102. Hereinafter, the applications may be simply referred to as "apps". The apps 101 and 102 obtain necessary data objects by communicating with the platform 103. Specifically, the platform 103 generates an image data object from an image data object stored on the memory 15 and stores the image data object on the platform memory area RAM 13b and the display app 101 obtains the image data object by the platform 103 transferring to the application memory are RAM 13b.

Hereinafter, an operation of displaying a preview image on the display 171 of the operation panel 17 will be described. Users turn on preview mode and select an image data object stored on the memory 15 via a preview settings screen by operating the operation panel 17, then an image is displayed in a smaller size and a lower resolution than those of the original image data object and displayed as a preview image.

In this embodiment, when the screen of the display 171 is updated, it is judged whether or not the updated screen allows users to operate a display data object with a gesture operation; i.e., here, it is judged whether or not the updated screen matches a type of screen that is registered in advance. Hereinbelow, a preview image display screen will be described as an example of the registered type of screen, which should not be interpreted as being limited to this example, as is obvious.

If it is judged that the updated screen allows users to operate a display data object with a gesture operation, an image size is determined and an image data object identical with the currently displayed preview image is generated in the determined image size, by the platform 103. The determination of an image size will be further described below.

At the beginning, depending on the type of gesture operation, a range of gesture motion is determined with reference to a preview image display area (hereinafter will be also referred to as "preview display area") of the display 171.

Figure 3:
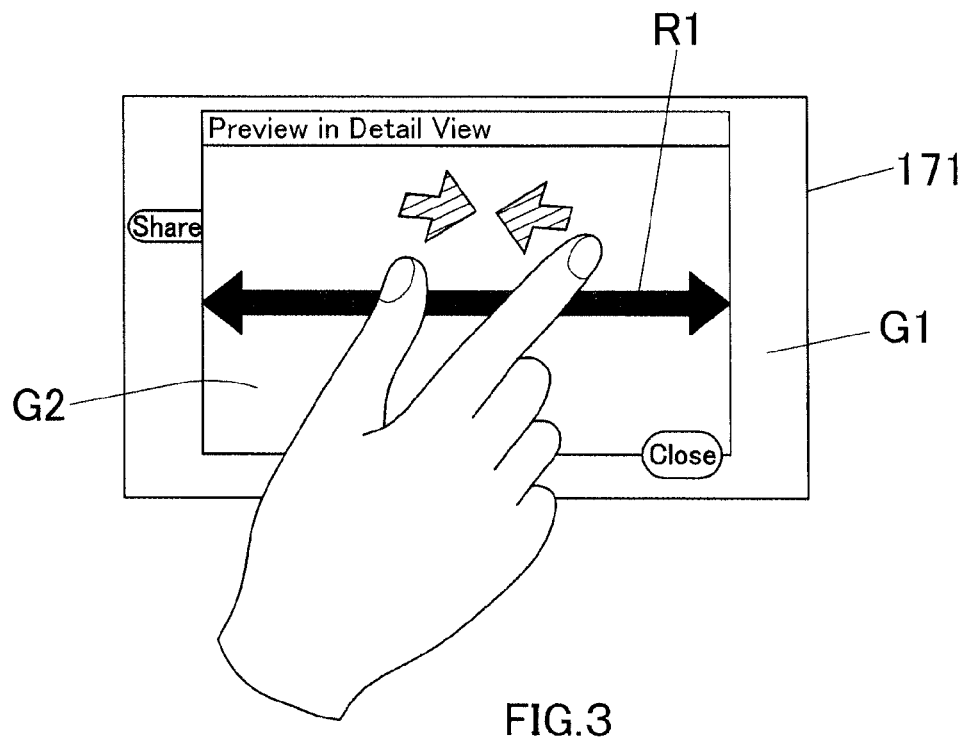
FIG. 3 is an explanatory view of a method of determining the size of an image data object to be generated.
Figure 4:
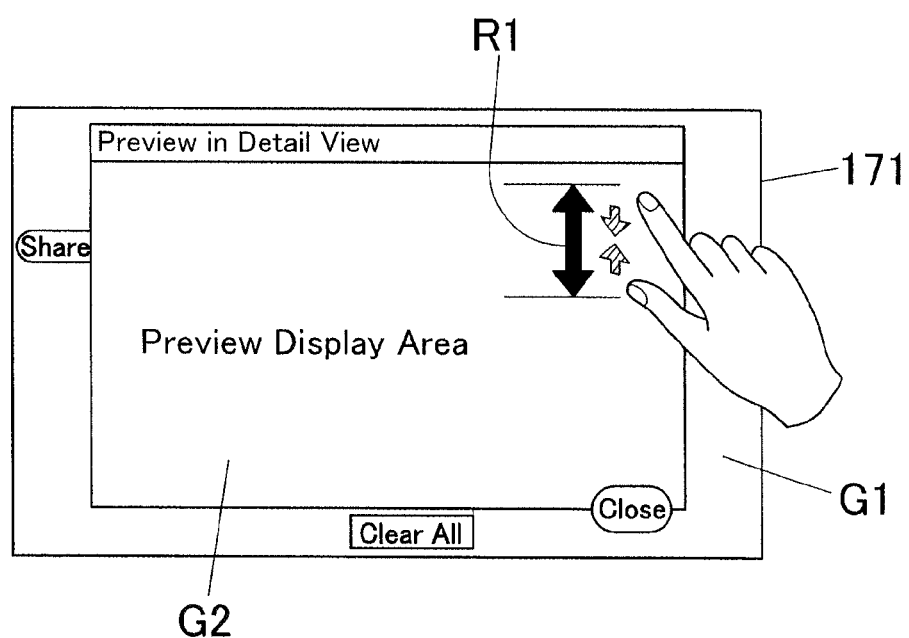
FIG. 4 is another explanatory view of a method of determining the size of an image data object to be generated.

When a user performs a pinch gesture such as a pinch-out gesture or a pinch-in gesture, an ordinary user's path length of the thumb and the index finger being pinched out is defined as a predetermined value. With reference to FIG. 3, if the length of a vertical or horizontal side, whichever longer, of a preview display area G2 on the display 171 is less than the predetermined value, the range of pinch gesture motion R1 is set to the length of the longer side. With reference to FIG. 4, if the size of a screen G1 on the display 171 is not less than the predetermined value, the range of pinch gesture motion R1 is set to the user's path length of the fingers involved in the pinch gesture. The range of pinch gesture motion R1 may be set to a value specified in advance or may be an average value of the user's path lengths of the fingers involved in the past pinch gestures, which are stored on the memory 15 as a part of the user's log, as detailed below.

Figure 5:
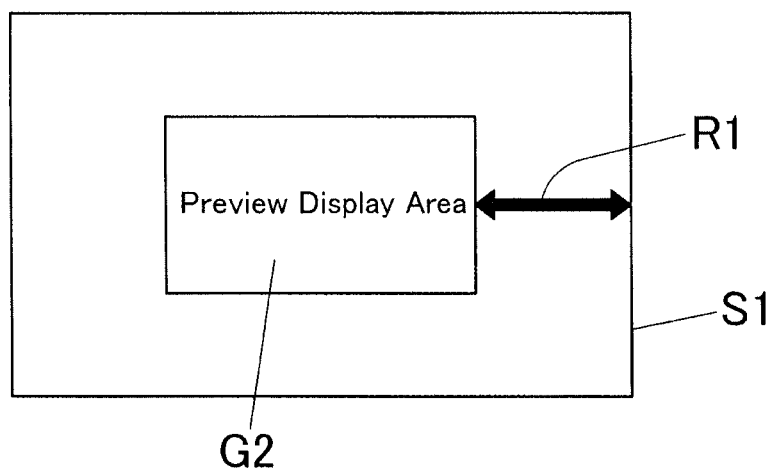
FIG. 5 is a view illustrating the relationship between the size of an image data object to be generated and a preview display area, when a pinch gesture is performed.

Now with reference to FIG. 5, the size of an image data object to be generated is set to a size S1 that is greater than the size of the preview display area G2, by the determined range of pinch gesture motion R1. Thus, when a user performs one pinch-in gesture for example, an image data object is generated in an optimal size, which is determined with reference to the size of the screen G1 of the display 171, such that the entire image data object fits in the preview display area G2.

After an image size is determined by the platform 103 in the above-described way, an image data object is generated in the determined image size from the currently displayed preview image and stored on the platform memory area RAM 13a of the RAM 13, also by the platform 103. The resolution of an image data object to be generated may be determined with reference to a zoom factor to pinch-out gesture; although, it is only necessary to generate an image data object in a higher resolution than that of the currently displayed preview image because users would like to view only a part of it in a larger size in this case.

Figure 6:
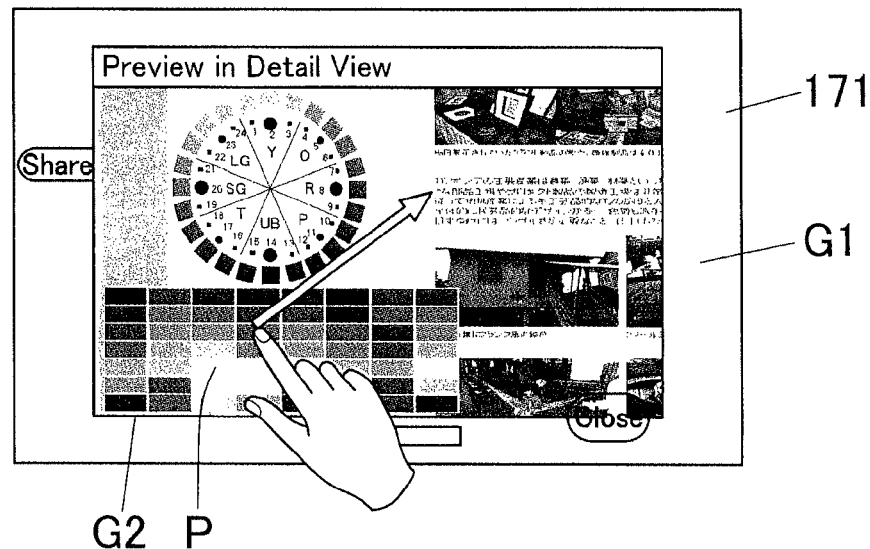
FIG. 6 is an explanatory view of a slide gesture for moving a preview image.
Figure 7:
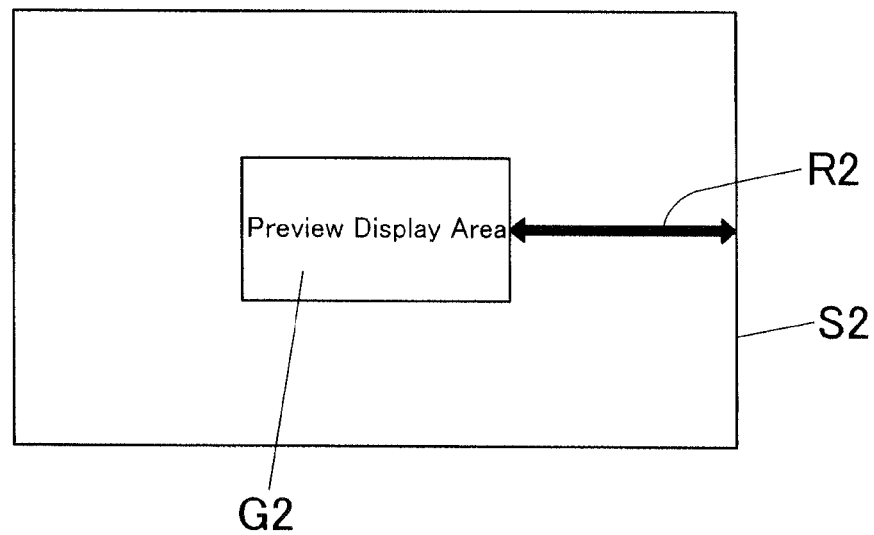
FIG. 7 is a view illustrating the relationship between the size of an image data object to be generated and a preview display area to appear when a slide gesture is performed.

Hereinafter, with reference to FIG. 6, a method of determining an image size when a user performs a flick gesture or a swipe gesture (both will be referred to as "slide gesture") to move an image will be described. When a user performs a slide gesture, the range of slide gesture motion R2 is set to the length of a vertical or horizontal side, whichever longer, of the preview display area G2. Subsequently, with reference to FIG. 7, the size of an image data object to be generated is set to a size S2 that is greater than the size of the preview display area G2 by the determined range of slide gesture motion R2.

Figure 8A:
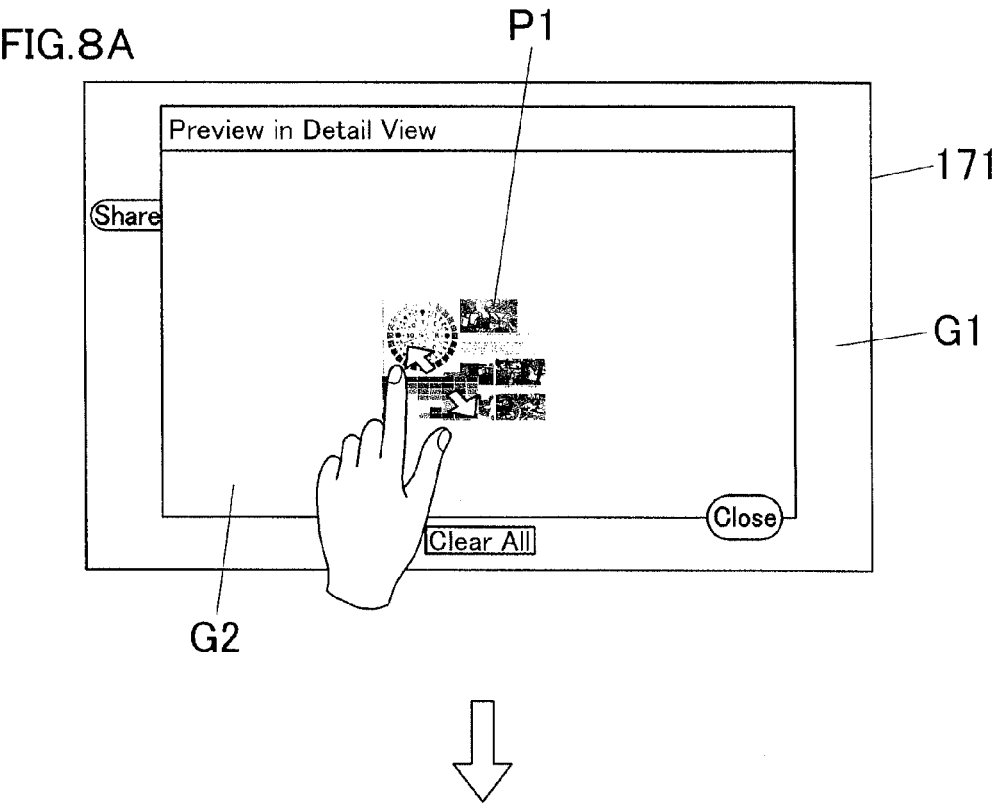
FIGS. 8A and 8B are explanatory view of an operation when a zoom-in gesture is performed on a preview image.
Figure 8B:
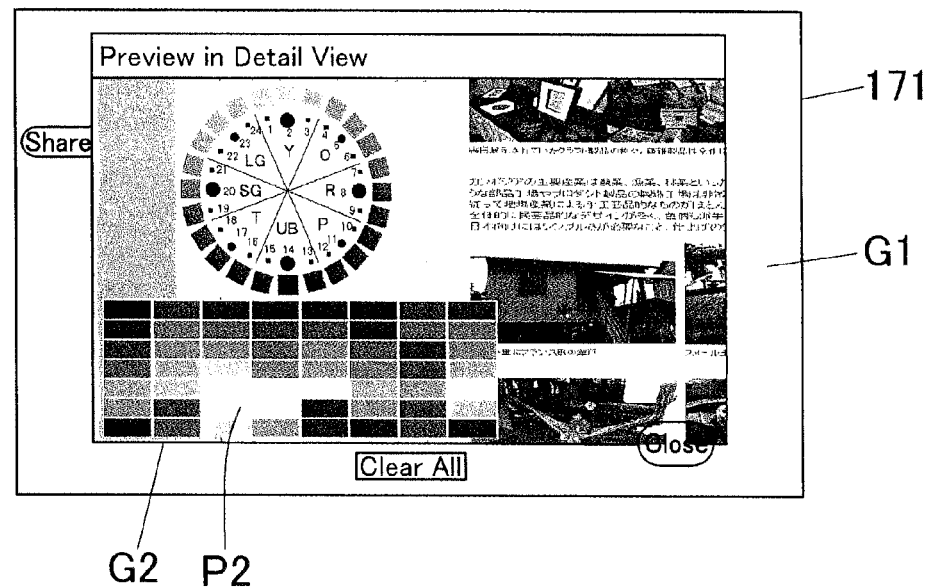

After an image size is determined by the platform 103 in the above-described way, an image data object is generated in the determined image size and resolution and transferred to the application memory area RAM 13b from the platform memory area RAM 13a in advance, also by the platform 103. When the user performs a gesture operation on a preview image P1 as illustrated in FIG. 8A, in response to the gesture operation, the image data object generated and received from the platform 103 is enlarged, reduced, or moved to be converted into a display data object P2, by the display app 101. The display data object P2 is then displayed in the preview display area G2 by the display app 101 as illustrated in FIG. 8B.

If pinch gestures and slide gestures are both enabled, it is required to generate image data objects in desirable image sizes both for a pinch gesture and a slide gesture and transferred to the display app 101 in advance.

Figures 9A, 9B:
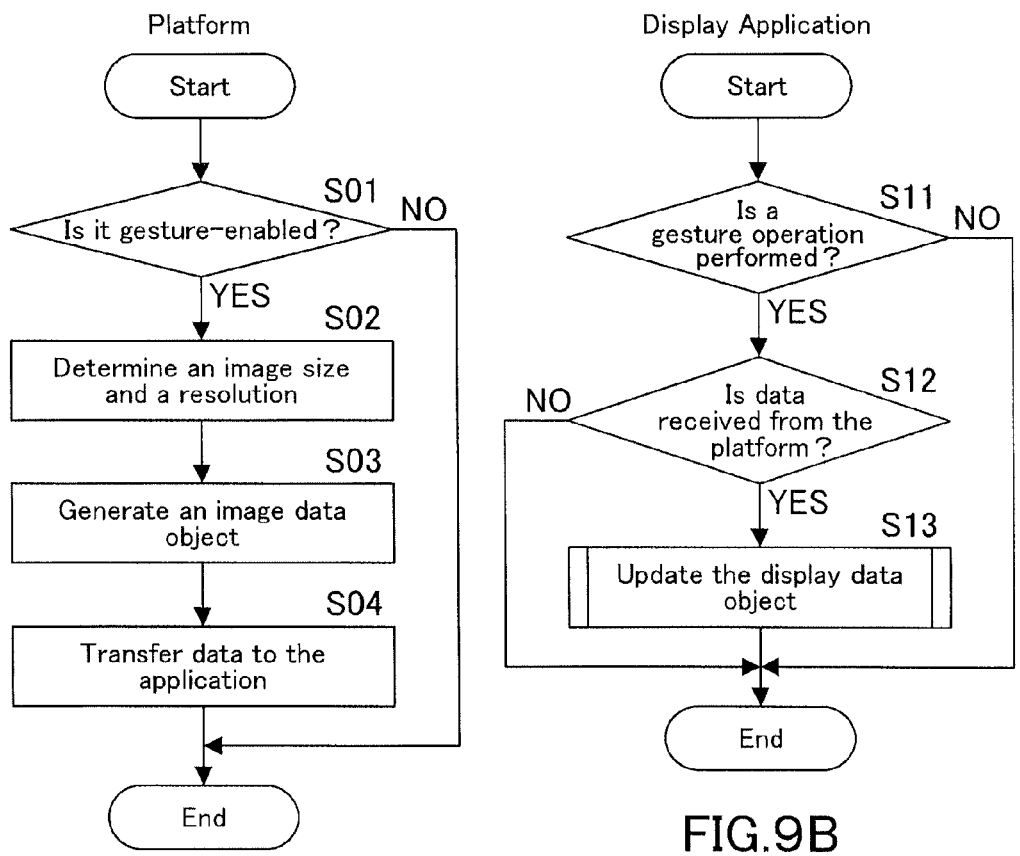
FIGS. 9A and 9B are flowcharts each representing an operation of the image processing apparatus, after the display screen is updated to enable gestures.

FIGS. 9A and 9B are flowcharts each representing an operation of the MFP 1, after the screen of the display 171 is updated into a gesture-enabled screen. The flowcharts of FIGS. 9A and 9B and the following flowcharts are executed by the CPU 11 in accordance with the display app 101 or an operation program stored on a recording medium such as the ROM 12 or the memory 15.

FIG. 9A is a routine in accordance with the platform 103; FIG. 9B is a routine in accordance with the display app 101.

In accordance with the platform 103, it is judged in Step S01 whether or not the updated screen of the display 171 allows users to operate a display data object with a gesture operation (whether or not it is gesture-enabled). If it is not gesture-enabled (NO in Step S01), the routine terminates.

If it is gesture-enabled (YES in Step S01), the size and the resolution of an image data object to be generated are determined in Step S02, and an image data object is generated and stored on the platform memory area RAM 13a in Step S03. In Step S04, the generated image data object is transferred to the display app 101 and stored on the application memory area RAM 13b.

In accordance with the display app 101, it is judged in Step S11 whether or not a gesture operation is performed. If it is not performed (NO in Step S11), the routine terminates.

If a gesture operation is performed (YES in Step S11), then it is judged in Step S12 whether or not any image data object is received from the platform 103, in other words, whether or not any image data object is stored on the application memory area RAM 13b. If it is stored thereon (YES in Step S12), the display data object is updated in Step S13. If no image data object is received therefrom (NO in Step S12), the routine terminates.

Figure 10:
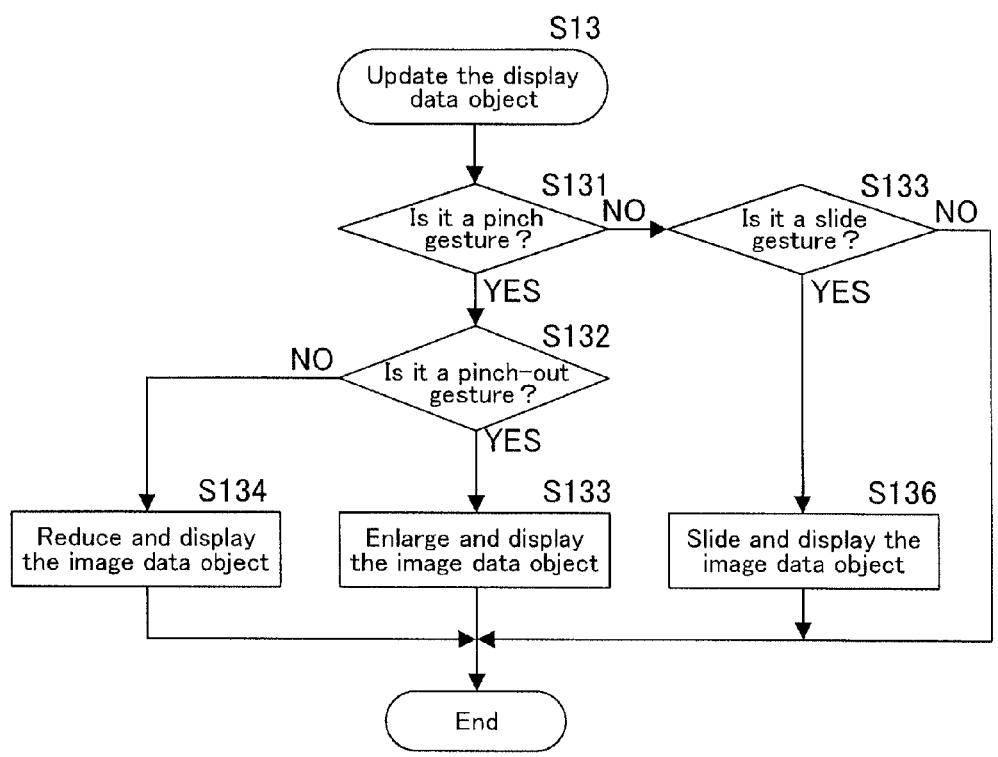
FIG. 10 is a flowchart representing the details of the update of a display data object in Step S13 of FIG. 9B.

FIG. 10 is a flowchart representing the details of the update of the display data object in Step S13 of FIG. 9B.

In Step S131, it is judged whether or not the gesture operation is a pinch gesture. If it is a pinch gesture (YES in Step S131), then it is judged in Step S132 whether or not it is a pinch-out gesture, in other words, whether or not it is an instruction for enlargement. If it is an instruction for enlargement (YES in Step S132), the routine proceeds to Step S133, in which the image data object generated and received from the platform 103 is enlarged and displayed on the display 171 in response to the gesture operation, thus the screen of the display 171 is updated.

If it is not an instruction for enlargement (NO in Step S132), the routine proceeds to Step S134, in which the image data object generated and received from the platform 103 is reduced and displayed on the display 171 in response to the gesture operation, thus the screen of the display 171 is updated.

Back to Step S131, if it is not a pinch gesture (No in Step S131), then it is judged in Step S135 whether or not it is a slide gesture. If it is a slide gesture (YES in Step S135), the routine proceeds to Step S136, in which the image data object generated and received from the platform 103 is moved and displayed on the display 171 in response to the gesture operation, thus the screen of the display 171 is updated.

In Step S135, if it is not a slide gesture (NO in Step S135), the routine terminates.

As described above, in this embodiment, it is judged whether or not the screen of the display 171 allows users to operate a display data object with a gesture operation, and if it allows users to operate a display data object, an image size is determined and an image data object identical with the display data object is generated in the determined image size and stored on the RAM 13. Thus it is not required any more that an image data object be generated before a gesture-enabled screen is displayed. As a result, the memory space requirements can be reduced to a minimum and the memory space of the RAM 13 would not be occupied by prepared image data objects. Furthermore, when a user performs a gesture operation, in response to the gesture operation, the display data object is updated with the image data object generated and stored on the RAM 13. Thus it is not required any more that a medium-resolution image be generated from a low-resolution image or a high-resolution image and that both a low-resolution image and a medium-resolution image be enlarged or reduced in response to a gesture operation. As a result, the display data object can be updated quickly in response to a gesture operation without complex processing.

Furthermore, an image size is determined, an image data object is generated, and the generated image data object is transferred to (stored on) the application memory area RAM 13b from the platform memory area RAM 13a by the platform 103, in advance of a gesture operation. When a gesture operation is performed, in response to the gesture operation, the display data object is updated with the image data object stored on the application memory area RAM 13b, by the display app 101. Thus now the processing speed is higher than that in the case in which an image data object is generated and transferred to the application memory area RAM 13b by the platform 103 every time a gesture operation is performed. As a result, the display data object can be updated more quickly in response to a gesture operation.

Figure 11A:
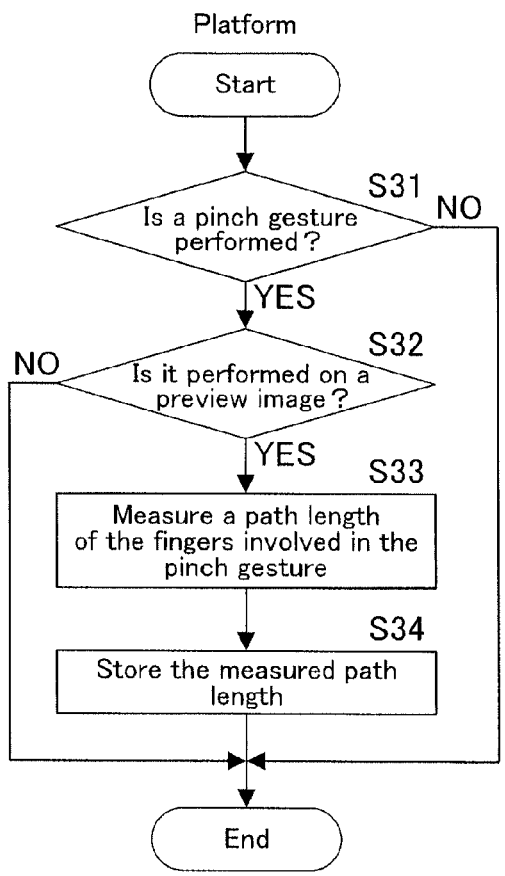
FIGS. 11A and 11B are flowcharts each representing an operation of calculating a user's path length of the fingers involved in a gesture operation, which serves as the range of gesture motion, with reference to the user's log when determining the size of an image data object to be generated by a platform.
Figure 11B:
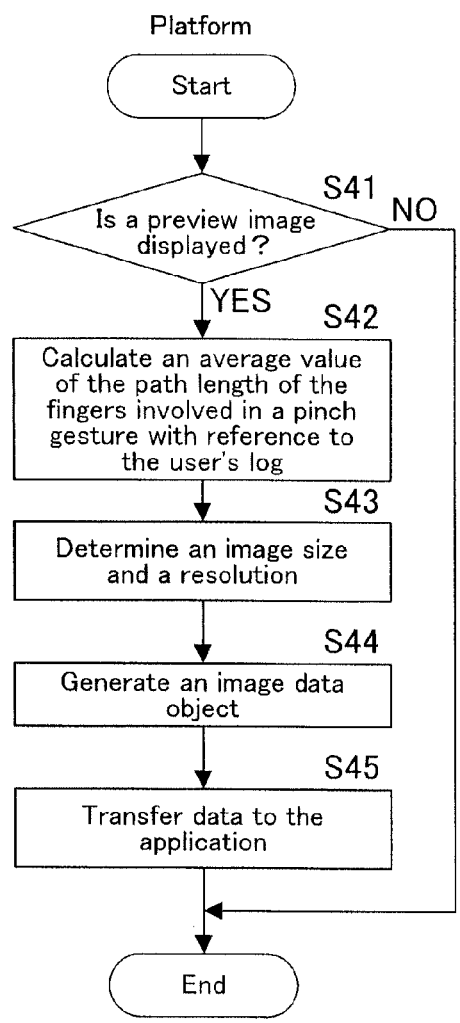

FIGS. 11A and 11B are flowcharts each representing an operation of determining a user's path length of the fingers involved in a gesture operation, which serves as the range of gesture motion, with reference to the user's log when determining the size of an image data object to be generated by the platform 103. In this example, a user performs a pinch gesture. This is a user already logged onto the image processing apparatus by inputting logon information, such as a user ID and a password, via the operation panel 17.

In Step S31, it is judged whether or not a pinch gesture is performed. If a pinch gesture is not performed (NO in Step S31), the routine terminates. If a pinch gesture is performed (YES in Step S31), then it is judged in Step S32 whether or not it is a pinch gesture performed on a preview image. If it is not a pinch gesture performed on a preview image (NO in Step S32), the routine terminates. If it is a pinch gesture performed on a preview image (YES in Step S32), a path length of the fingers involved in the pinch gesture is measured in Step S33, and the measured path length is connected to the user's logon information and stored on the memory 15 in Step S34.

That means, every time a pinch gesture is performed on a preview image, a path length of the fingers involved in the pinch gesture is stored on the memory 15 as a part of the user's log.

Concurrently, also in accordance with the platform 103, it is judged in Step S41 whether or not a preview image is displayed on the updated screen. If it is not displayed (NO in Step S41), the routine terminates. If a preview image is displayed (YES in Step S41), an average value of the path lengths of the fingers involved in the past pinch gestures is calculated with reference to the user's log in Step S42. Subsequently, in Step S43, an image size and a resolution are determined with reference to the range of pinch gesture motion that is the calculated average value; an image data object is generated in Step S44. In Step S45, the generated image data object is transferred to the display app 101.

As described above, the size of an image data object to be generated is determined with reference to an average value of the user's path lengths of the fingers involved in the past pinch gestures, thus an image data object is generated in an optimal size for the user's pinch gesture.

Figure 12A:
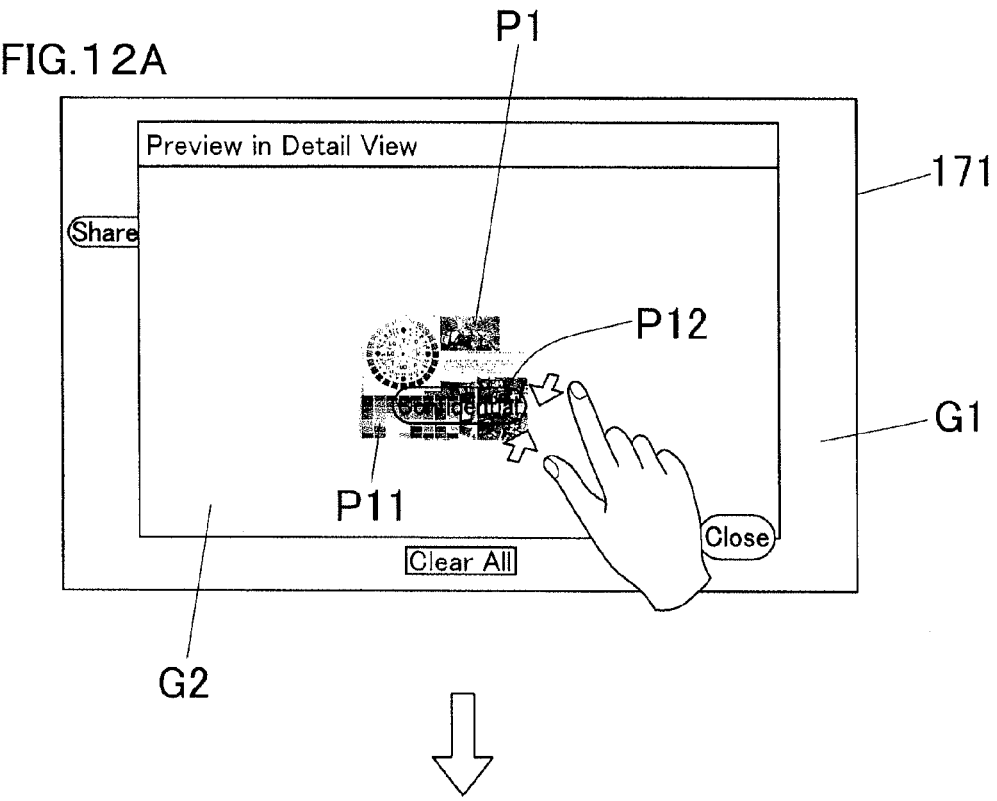
FIGS. 12A and 12B are views each illustrating a screen that shows a preview image in another embodiment of the present invention.
Figure 12B:
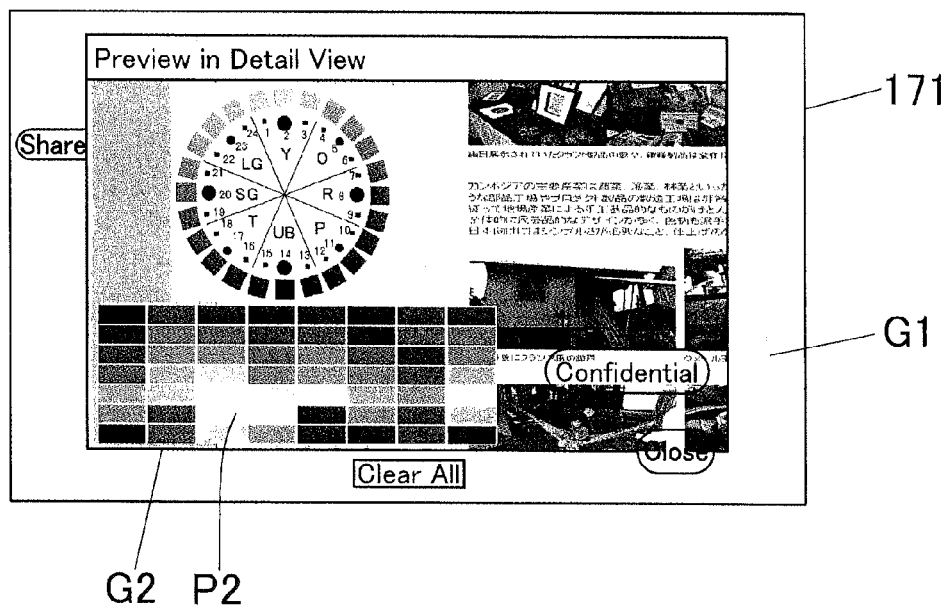

FIGS. 12A and 12B are views each illustrating a screen of the display 171 that shows a preview image in another embodiment of the present invention. In this embodiment, if the preview image P1 is an edited image that is composed of an original image P11 and an additional image such as a stamp image P11 or an overlaid image as illustrated in FIG. 12A, users may hope to obtain an image P2 of FIG. 12b by enlarging the preview image P1 in order to check the details and adjust the position of the additional image if necessary. Thus, when a gesture operation is performed on such an edited preview image, an image data object is generated in a higher resolution than that for an unedited preview image.

As for a method of determining a resolution, a suitable resolution for an image size determined with reference to the range of gesture motion may be multiplied by a predetermined coefficient. For example, with the assumption that users would enlarge the preview image by repeating a pinch-out gesture multiple times, a suitable resolution for an image size determined with reference to the range of pinch-out gesture motion is multiplied by a number greater than one.

Similarly, in this embodiment, an image data object is generated in a high resolution and transferred to the display app 101 (stored on the application memory area RAM 13b) by the platform 103, in advance of a gesture operation. When a gesture operation is performed, the image data object is enlarged or reduced and the display data object is updated by the display app 101. Thus it is not required any more that another preview image be generated and that the platform 103 and the display app 101 perform communication every time a gesture operation is performed, which contributes to simplicity of processing and improves user-friendliness. Furthermore, an image data object is generated in a higher resolution than that for an unedited preview image; as a result, a preview image can show an additional image sharply even being enlarged with a gesture operation.

Figure 13:
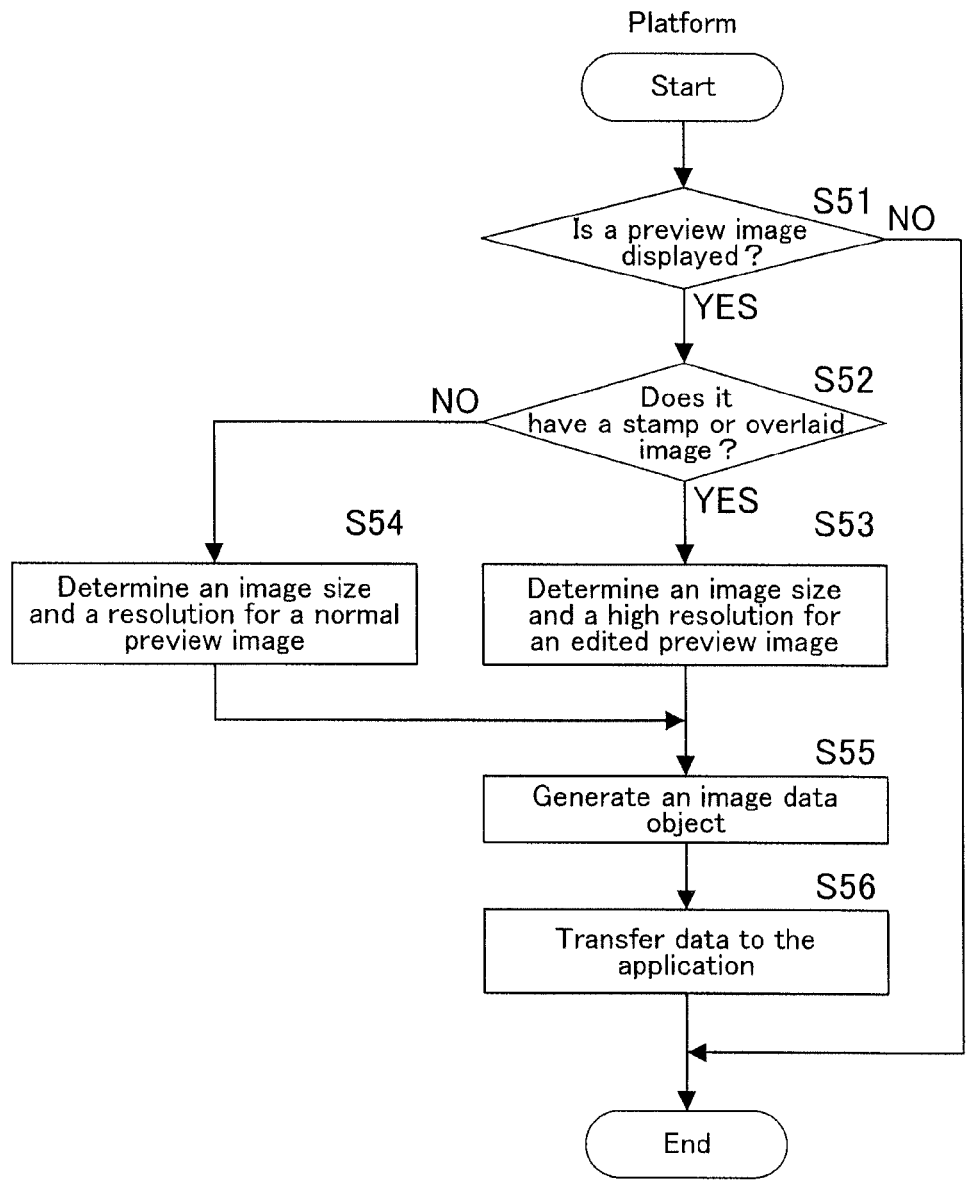
FIG. 13 is a flowchart representing an operation of the platform in the embodiment of FIG. 12.

FIG. 13 is a flowchart representing an operation of the platform 103 in the embodiment of FIG. 12.

In Step S51, it is judged whether or not a preview image is displayed on the updated screen; if it is not displayed (NO in Step S51), the routine terminates. If a preview image is displayed (YES in Step S51), then it is judged in Step S52 whether or not the preview image has an additional image such as a stamp image or an overlaid image. If it does not have an additional image (NO in Step S52), an image size is determined and a normal resolution for an unedited preview image is determined in Step S54, then the routine proceeds to Step S55. If it has an additional image such as a stamp image or an overlaid image (YES in Step S52), an image size and a high resolution for such an edited preview image is determined in Step S53, then the routine proceeds to Step S55.

In Step S55, an image data object is generated in the determined image size and resolution. The generated image data object is transferred to the display app 101 and stored on the application memory area RAM 13b in Step S56.

Figure 14:
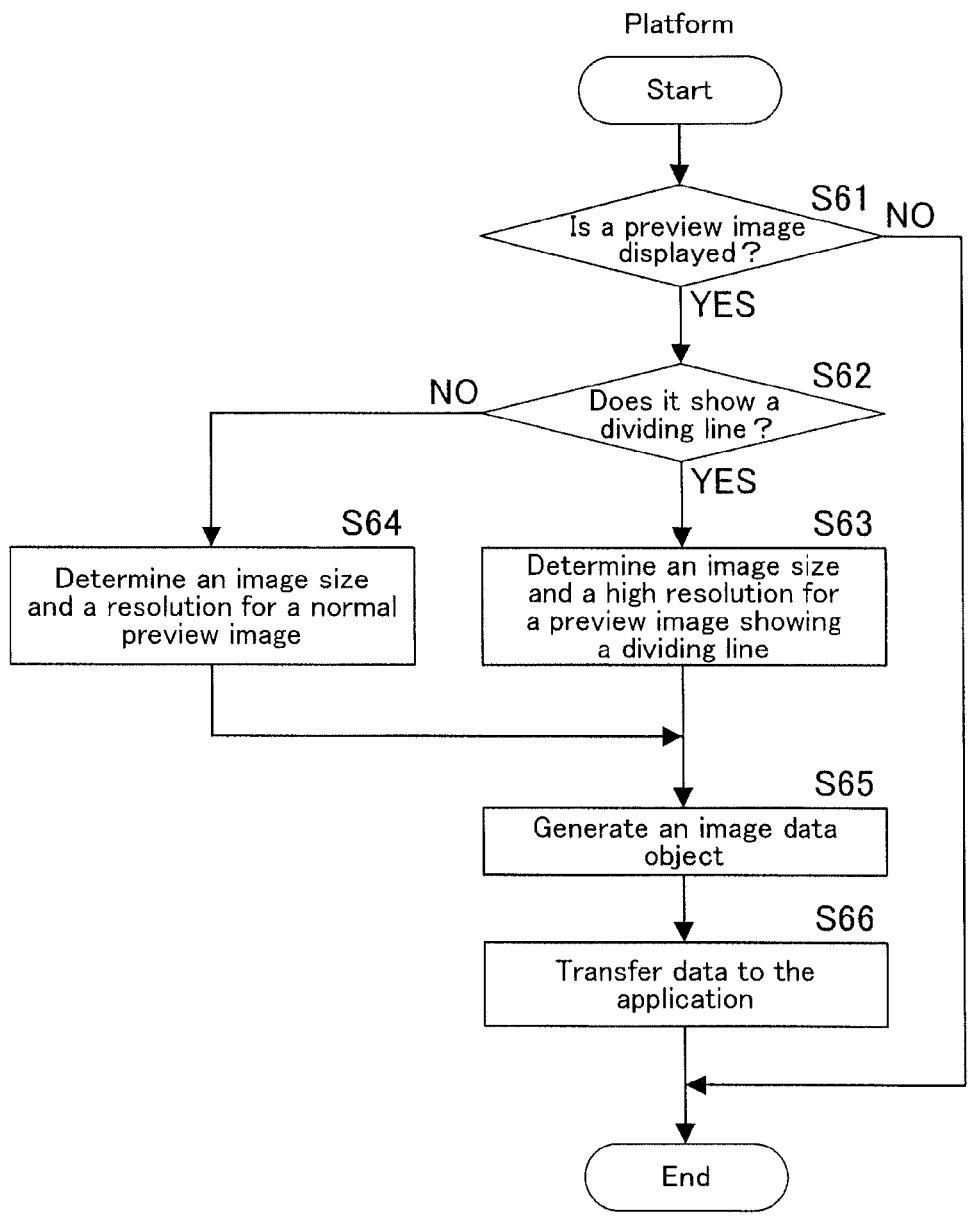
FIG. 14 is a flowchart representing an operation of the platform in yet another embodiment of the present invention.

FIG. 14 is a flowchart representing an operation of the platform 103 in yet another embodiment of the present invention.

In this embodiment, if a preview image showing a dividing line between two pictures, for example, is displayed on the updated screen, users may hope to enlarge the preview image to check the details around the dividing line. Thus, in this embodiment, when a gesture operation is performed on a preview image showing a dividing line between pictures, an image data object is generated in a higher resolution than that for an unedited preview image.

In Step S61, it is judged whether or not a preview image is displayed on the updated screen; if it is not displayed (NO in Step S61), the routine terminates. If a preview image is displayed (YES in Step S61), then it is judged in Step S62 whether or not the preview image shows a dividing line. If it does not show a dividing line (NO in Step S52), an image size is determined and a normal resolution for an unedited preview image is determined in Step S64, then the routine proceeds to Step S65. If it shows a dividing line (YES in Step S62), an image size is determined and a high resolution for such a preview image is determined in Step S63; then the routine proceeds to Step S65.

In Step S65, an image data object is generated in the determined image size and resolution. The generated image data object is transferred to the display app 101 in Step S66.

As for a method of determining a resolution in Step S63, a suitable resolution for an image size determined with reference to the range of gesture motion may be multiplied by a predetermined coefficient. For example, with the assumption that users would enlarge the preview image with a pinch-out gesture being repeated multiple times, a suitable resolution for an image size determined with reference to the range of pinch-out gesture motion is multiplied by a number greater than one.

Similarly, in this embodiment, an image data object is generated in a high resolution and transferred to the display app 101 by the platform 103, in advance of a gesture operation. When a gesture operation is performed, the image data object is enlarged or reduced and the display data object is updated by the display app 101. Thus it is not required any more that another preview image be generated and that the platform 103 and the display app 101 perform communication every time a gesture operation is performed, which contributes to simplicity of processing and improves user-friendliness. Furthermore, an image data object is generated in a higher resolution than that for an unedited preview image; as a result, a preview image can show a dividing line between pictures sharply even being enlarged by a gesture operation.

Figure 15:
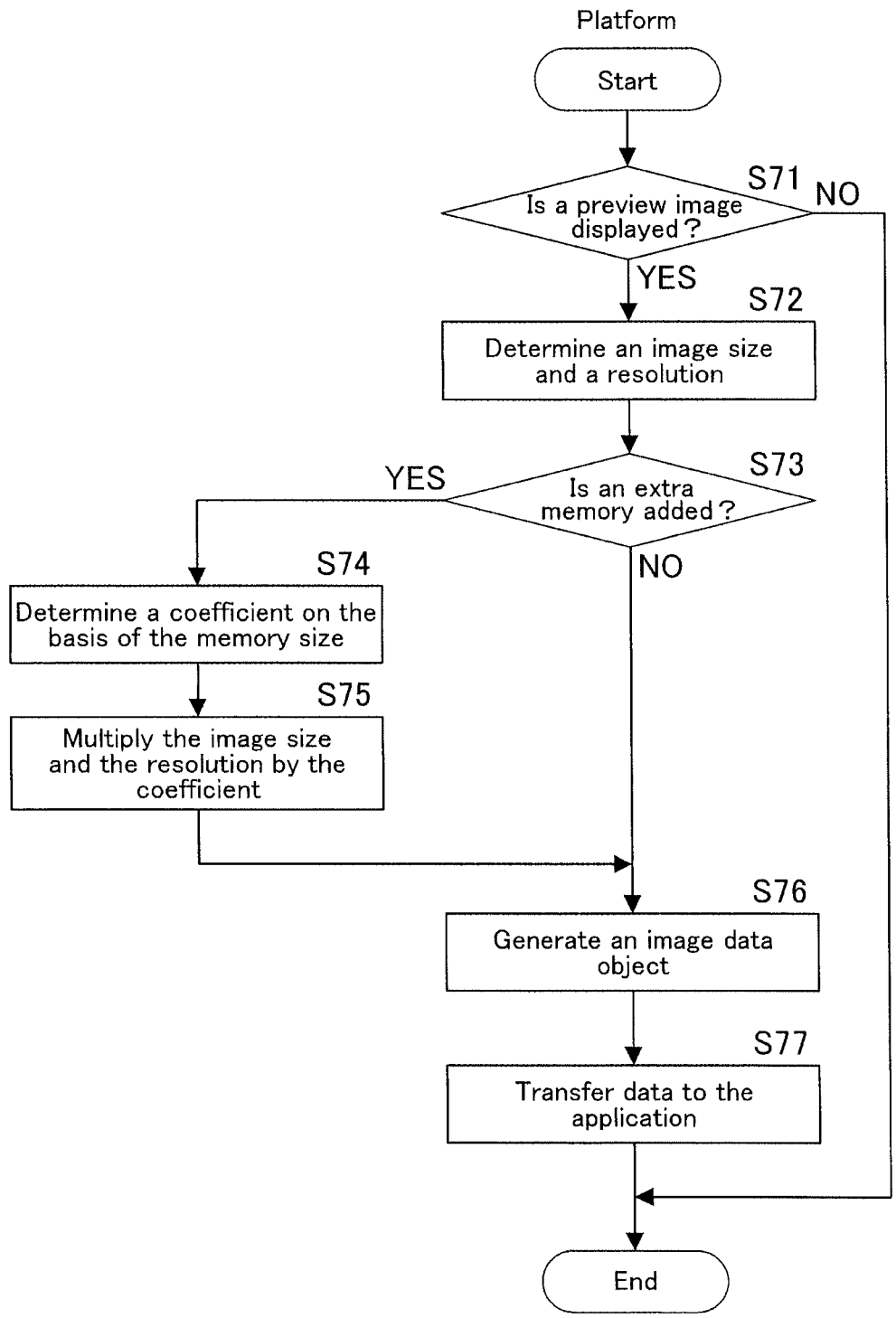
FIG. 15 is a flowchart representing an operation of the platform in still yet another embodiment of the present invention.

FIG. 15 is a flowchart representing an operation of the platform 103 in still yet another embodiment of the present invention.

In this embodiment, if the RAM 13 of the MFP 1 has a great memory size (memory space), an image data object is generated in a large size and a high resolution by the platform 103.

The MFP 1 is capable of supporting an extra memory (RAM) to have more functions and improve its processing speed. Thus, in this embodiment, if memory expansion allows the memory space to afford to store more data, an image data object is generated in a large size and a high resolution and the generated image data object is transferred to the display app 101 in advance of a gesture operation. When a gesture operation is performed, in response to the gesture operation, a display data object is generated from the image data object stored on the application memory area RAM 13, by the display app 101. Thus it is not required any more that the platform 103 and the display app 101 transmit and receive an image data object in a large size and a high resolution every time a gesture operation is performed. As a result, the screen can be updated quickly in response to a gesture operation.

In Step S71, it is judged whether or not a preview image is displayed on the updated screen; if it is not displayed (NO in Step S71), the routine terminates. If a preview image is displayed (YES in Step S71), the size and the resolution of an image data object to be generated are determined in Step S72.

In Step S73, it is judged whether or not an extra memory is added; if it is added (YES in Step S73), a coefficient is determined on the basis of the memory size in Step S74. In this embodiment, as indicated in FIG. 16, the coefficient for obtaining the range of pinch gesture motion is set to 1.00 when the memory size is 1.00 GB as normal and is set to 2.00 when the memory size is 2.00 GB because of memory expansion. The table of FIG. 16 is an example to explain that the coefficient for obtaining the range of pinch gesture motion is set to a greater value than 1.00 depending on the amount of extra memory added. That is, a coefficient may be determined on the basis of the entire memory space or the amount of memory added.

Back to FIG. 15 of Step S75, the image size and the resolution, both determined in Step S72, are adjusted by being multiplied by a suitable coefficient for 2.00 GB of the memory size due to memory expansion. Then the routine proceeds to Step S76. Back to Step S73, if an extra memory is not added (NO in Step S73), the routine proceeds to Step S76 directly.

In Step S76, an image data object is generated in the determined image size and resolution. The generated image data object is transferred to the display app 101 in Step S77.

As for a method of determining a resolution in Step S75, a suitable resolution for an image size determined with reference to the range of gesture motion may be multiplied by a predetermined coefficient. For example, with the assumption that users would enlarge the preview image with a pinch-out gesture being repeated multiple times, a suitable resolution for an image size determined with reference to the range of pinch-out gesture motion is multiplied by a number greater than one.

The embodiment described with reference to FIG. 15 can be combined with another embodiment.

Figure 17:
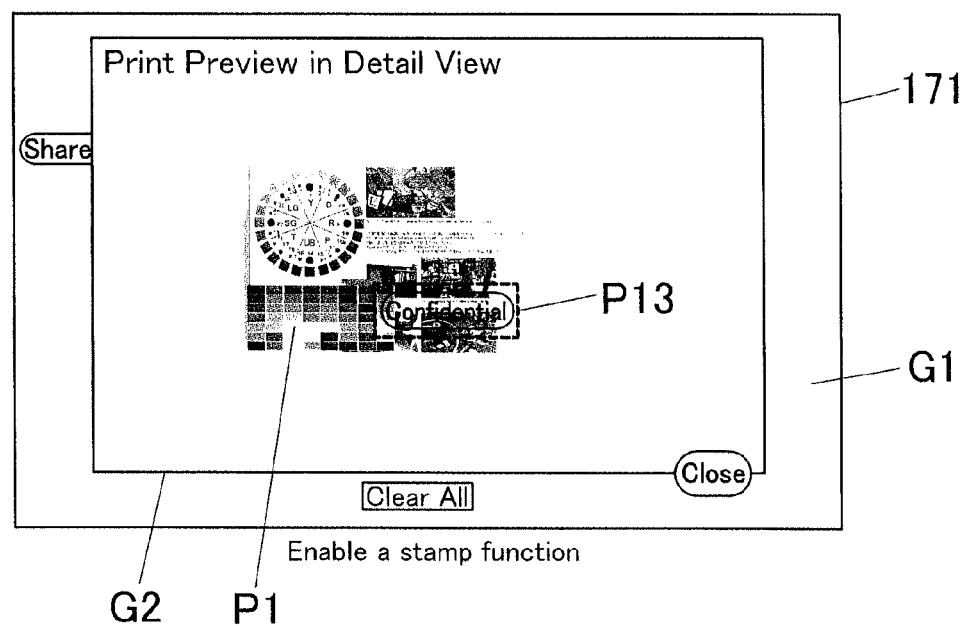
FIG. 17 is a view illustrating a preview image to be displayed in print preview mode in still yet another embodiment of the present invention.

FIG. 17 illustrates still yet another embodiment of the present invention. In this embodiment, the MFP 1 has print preview mode; in this mode, a preview image is subject to a predetermined function being enabled, while being displayed. If a preview image is displayed in print preview mode, an image data object of the periphery of a target position on the preview image, which is subject to a predetermined function being enabled, is generated in a high resolution by the platform 103, and then, the generated image data object and the original preview image are consolidated and displayed by the display app 101.

For example, as illustrated in FIG. 17, a stamp image may be given to the original preview image P1 by a stamp function. In such a case, an image data object P13 of the periphery of a stamp position on the preview image P1 is generated in a high resolution, and then the generated image data object and the original preview image P1 are consolidated and displayed.

In print preview mode, a preview image can be subject to a stamp function as mentioned above and other predetermined functions such as the following: a page number print function; an overlay function; a ground pattern print function; and a date print function.

Figures 18A, 18B:
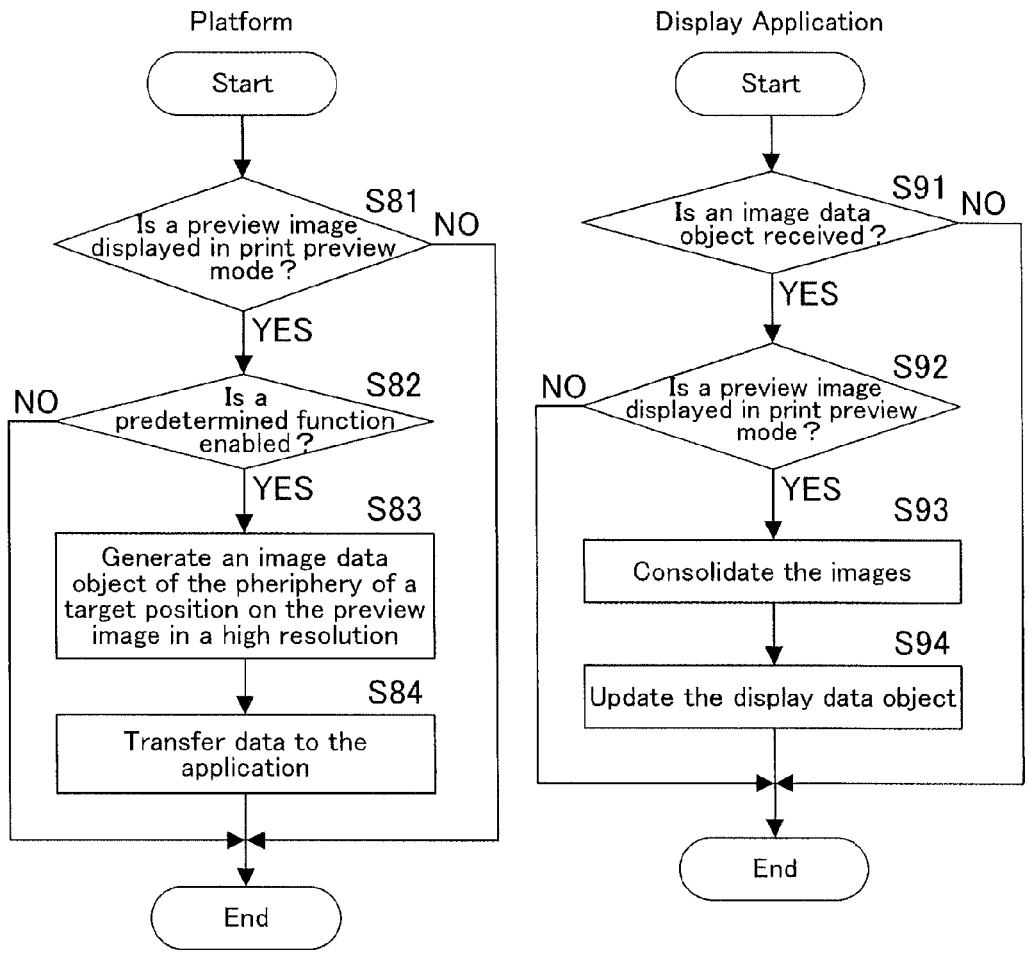
FIGS. 18A and 18B are flowcharts representing operations to be performed in print preview mode in the embodiment of FIG. 17.

FIGS. 18A and 18B are flowcharts representing operations to be performed by the platform 103 and the display app 101 in print preview mode in the embodiment of FIG. 17.

In accordance with the platform 103, it is judged in Step S81 whether or not a preview image is displayed in print preview mode. If it is not displayed in print preview mode (NO in Step S81), the routine terminates.

If it is displayed in print preview mode (YES in Step S81), then it is judged in Step S82 whether or not a predetermined function, such as a stamp function, is enabled. If it is not enabled (NO in Step S82), the routine terminates. If it is enabled (YES in Step S82), an image data object of the periphery of a stamp position on the preview image is generated in a high resolution in Step S83. In Step S84, the generated image data object is transferred to the display app 101.

In accordance with the display app 101, it is judged in Step S91 whether or not an image data object is received. If it is not received (NO in Step S91), the routine terminates. If it is received (YES in Step S91), then it is judged in Step S92 whether or not a preview image is displayed in print preview mode. If it is not displayed in print preview mode (NO in Step S92), the routine terminates. If it is displayed in print preview mode (YES in Step S92), the routine proceeds to Step S93 in which the image data object of the periphery of a stamp position, which is generated by the platform 103, and the currently displayed preview image are consolidated. In Step S94, the display image data object is updated with the consolidated image data object.

In this embodiment, when a user performs a pinch-out gesture, for example, on a target position of a preview image, which is subject to a predetermined function being enabled, a new image data object is generated in a high resolution and the user can view the preview image in good quality even after enlargement. Thus, apparently, it is not required any more that the platform 103 and the display app 101 transmit and receive an image data object when a gesture operation is performed. As a result, the screen can be updated quickly in response to a gesture operation.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A display control device comprising:
    a display;
    a touch panel being capable of detecting a gesture operation;
    a judgment portion that judges whether or not a screen displayed on the display allows users to operate a display data object with the gesture operation;
    a memory;
    an image generator that:
        determines an image size, that generates an image data object identical with the display data object in the determined image size, and that stores the generated image data object on the memory, upon the screen being judged as allowing users to operate the display data object with the gesture operation, and
        sets a range of a gesture motion of the gesture operation to the length of a vertical or horizontal side, whichever longer, of a display area for the display data object if the length of the longer side is less than a predetermined value, wherein the image generator sets the range of the gesture motion to a path length of the gesture motion if the length of the longer side is not less than a second predetermined value; and
    a display controller that updates the display data object with the image data object generated by the image generator and stored on the memory, on the basis of the gesture operation being performed on the screen, the screen being judged as allowing users to operate the display data object with the gesture operation.

2. The display control device as recited in claim 1, wherein:
    by executing a display application, the display controller updates the display data object with the image data object stored on the memory on the basis of the gesture operation being performed on the screen; and
    the image generator determines the image size by a platform excluding the display application, generates the image data object, and stores the generated image data object on the memory, in advance of the gesture operation being performed.

3. The display control device as recited in claim 1, wherein the image generator determines the image size as being greater than the size of the display area for the display data object by the range of gesture motion caused by the gesture operation.

4. The display control device as recited in claim 1, further comprising a path length memory that stores the path length of the gesture operation each time the gesture operation is repeated, wherein the image generator sets the range of gesture motion to an average value of the path lengths stored on the path length memory.

5. The display control device as recited in claim 1, wherein, if a preview image is displayed on the screen, the judgment portion judges that the screen allows users to operate the display data object with the gesture operation and the image generator generates the image data object in a higher resolution than that of the preview image.

6. The display control device as recited in claim 5, wherein, if the preview image is an edited image composed of a first image data object and a second image data object, the second image data object being laid on the first image data object, the image generator generates the image data object in a higher resolution than that for an unedited image.

7. The display control device as recited in claim 5, wherein, if the preview image shows a dividing line between pictures, the image generator generates the image data object in a higher resolution than that for a preview image showing no dividing line between pictures.

8. The display control device as recited in claim 5, wherein:
the display control device has print preview mode for allowing the preview image to be subject to a predetermined function being enabled; and
if the preview image is displayed in print preview mode, the image generator generates the image data object in a high resolution, the image data object showing the periphery of a target position on the preview image, the target position being subject to the predetermined function being enabled, and the display controller consolidates the original display data object and the high-resolution image data object showing the periphery of the target position.

9. The display control device as recited in claim 1, further comprising a detector that detects a memory space of the memory, wherein the image generator adjusts the image size by multiplying it by a coefficient, the coefficient being determined in advance for the memory space detected by the detector.

10. The display control device as recited in claim 1, wherein the gesture operation is any one of a pinch-out gesture, a pinch-in gesture, a flick gesture, and a swipe gesture.

11. A display control method to be implemented by a display control device comprising:
a display;
a memory; and
a touch panel being capable of detecting a gesture operation,
the display control method comprising:
judging whether or not a screen displayed on the display allows users to operate a display data object with the gesture operation;
determining an image size, generating an image data object identical with the display data object in the determined image size, and storing the generated image data object on the memory, upon the screen being judged as allowing users to operate the display data object with the gesture operation;
setting a range of a gesture motion of the gesture operation to the length of a vertical or horizontal side, whichever longer, of a display area for the display data object if the length of the longer side is less than a predetermined value, wherein the range of the gesture motion is set to a path length of the gesture motion if the length of the longer side is not less than a second predetermined value; and
updating the display data object with the image data object generated and stored on the memory, on the basis of the gesture operation being performed on the screen, the screen being judged as allowing users to operate the display data object with the gesture operation.

12. A non-transitory computer-readable recording medium having a display control program for a display control device comprising:
a display;
a memory; and
a touch panel being capable of detecting a gesture operation,
the display control program being stored on the non-transitory computer-readable recording medium to make a computer of the display control device execute:
judging whether or not a screen displayed on the display allows users to operate a display data object with the gesture operation;
determining an image size, generating an image data object identical with the display data object in the determined image size, and storing the generated image data object on the memory, upon the screen being judged as allowing users to operate the display data object with the gesture operation;
setting a range of a gesture motion of the gesture operation to the length of a vertical or horizontal side, whichever longer, of a display area for the display data object if the length of the longer side is less than a predetermined value, wherein the range of the gesture motion is set to a path length of the gesture motion if the length of the longer side is not less than a second predetermined value; and
updating the display data object with the image data object generated and stored on the memory, on the basis of the gesture operation being performed on the screen, the screen being judged as allowing users to operate the display data object with the gesture operation.

13. An image processing apparatus comprising the display control device as recited in claim 1, wherein:
the display is capable of displaying an image data object as a preview image;
the judgment portion judges whether or not the screen displayed on the display allows users to operate the preview image with the gesture operation;
the image generator determines the image size, generates the image data object identical with the display data object in the determined image size, and stores the generated image data object on the memory, upon the screen being judged as allowing users to operate the preview image with the gesture operation; and
the display controller updates the display data object with the image data object generated by the image generator and stored on the memory, on the basis of the gesture operation being performed on the screen, the screen being judged as allowing users to operate the preview image with the gesture operation.

* * * * *